US006514542B2

United States Patent
McGarrity et al.

(10) Patent No.: US 6,514,542 B2
(45) Date of Patent: *Feb. 4, 2003

(54) TREATMENTS FOR IMPROVED BEER FLAVOR STABILITY

(75) Inventors: Michael Jerome McGarrity, London (CA); David Jack Maradyn, London (CA); Robert Joseph Stewart, London (CA); Amanda Mary Tinginys, London (CA); Donald James Thompson, London (CA)

(73) Assignee: Labatt Brewing Company Limited, London (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,791

(22) Filed: Dec. 17, 1999

(65) Prior Publication Data

US 2002/0106422 A1 Aug. 8, 2002

Related U.S. Application Data

(63) Continuation-in-part of application No. 09/397,934, filed on Sep. 17, 1999, which is a continuation-in-part of application No. 09/102,014, filed on Jun. 22, 1998, now abandoned, which is a continuation of application No. 08/760,177, filed on Nov. 29, 1996, now Pat. No. 5,811,144, which is a continuation of application No. 08/481,983, filed on Jun. 7, 1995, now Pat. No. 5,582,857, which is a continuation of application No. 08/208,908, filed on Mar. 11, 1994, now abandoned, and a continuation of application No. 08/003,516, filed on Jan. 12, 1993, now abandoned.

(51) Int. Cl.$^7$ .............................................. C12C 11/00
(52) U.S. Cl. ........................... 426/16; 426/29; 426/592; 426/330.4
(58) Field of Search ............................. 426/16, 28, 29, 426/592, 330.4

(56) References Cited

U.S. PATENT DOCUMENTS

| 50,523 A | 10/1865 | Wall |
| 2,452,968 A | 11/1948 | Grafton et al. ................. 99/48 |
| 3,787,587 A | 1/1974 | Weber ......................... 462/248 |
| 4,389,421 A | 6/1983 | Palamand ................. 426/330.4 |
| 5,582,857 A | 12/1996 | Bordeleau et al. ........ 426/330.4 |
| 5,696,380 A | 12/1997 | Cooke et al. ................ 250/438 |
| 5,811,144 A | 9/1998 | Bordeleau et al. ........ 426/330.4 |

OTHER PUBLICATIONS

Back, W., Bacteria deletrious to beer, Monatsschrift fuer Brauerei, 34 (7) 267–76 1981.*

Sumino et al., Abstract of Jap. Pat. No. 401240179A, Method of Improving Quality of Liquors, Sep. 25, 1989.*

Shimamura et al., Abstract of Jap. Pat. No. 406303959A, Production of New Foaming Sake Similar to Beer, Nov. 1, 1994.*

J. Bergsman, A Silk Purse from a Sow's Ear, http://www.h-bd.org/brewery/library/lambic.html, Mar. 1995.*

Tamer et al., Enzyme Microb Technology 10:754–756, Dec. 1988.

Verzele, M. Et al., U. Inst. Brew. 73:255–257, 1967.

Sakuma et al., Sunstruck Flavor Formation in Beer, American Society of Brewing Chemists, Inc., 1991, 162–165.

* cited by examiner

Primary Examiner—Curtis E. Sherrer
(74) Attorney, Agent, or Firm—Levy & Grandinetti

(57) ABSTRACT

This invention is directed to the prevention of the production of skunky thiols upon exposure of beer to ultraviolet or visible light. Preferably, the invention is directed to the removal or inactivation of one or more of the reactants that are present in beer that bring about skunky thiol formation, particularly the removal of flavin reactants, especially riboflavin, or to the prevention of the light excitation of such reactants.

4 Claims, 4 Drawing Sheets

TREATMENTS FOR IMPROVED BEER FLAVOR STABILITY

CROSS-REFERENCES TO RELATED APPLICATIONS

This application is a continuation-in-part of U.S. application Ser. No. 09/397,934, filed Sep. 17, 1999, which is a continuation-in-part of U.S. application Ser. No. 09/102,014, filed Jun. 22, 1998, now abandoned, which is a continuation of U.S. application Ser. No. 08/760,177, filed Nov. 29, 1996, now U.S. Pat. No. 5,811,144, which was a continuation of U.S. application Ser. No. 08/481,983, filed Jun. 7, 1995, now U.S. Pat. No. 5,582,857, which was a continuation of U.S. patent application Ser. No. 08/208,908, filed Mar. 11, 1994, now abandoned, and a continuation of U.S. patent application Ser. No. 08/003,516, filed Jan. 12, 1993, now abandoned.

BACKGROUND OF THE INVENTION

1. Field of the Invention

The present invention relates to hopped malt beverages, especially alcoholic brewery beverages produced at least in part from malt, and to means for improving the flavor stability thereof. More particularly, the present invention relates to imparting to hopped malt beverages improved stability against the production of thiols associated with the development of a "skunky" odor and flavor in beer that has been exposed to ultra-violet or visible light.

2. Description of Related Art

The process of preparing fermented malt beverages, such as, beer, ale, porter, malt liquor, and other similar fermented alcoholic beverages, hereinafter referred to simply as "beer" for convenience, is historically well established. As practiced in modern breweries, the process, in brief, comprises preparing a "mash" of malt, usually with cereal adjuncts, and heating the mash to solubilize the proteins and convert the starch into sugar and dextrins. The insoluble grains are filtered off and washed with hot water that is then combined with the soluble material. The resulting wort is boiled in a brew kettle to inactivate enzymes, sterilize the wort, extract desired hop components from added hops, and coagulate certain protein-like substances. The wort is then strained to remove spent hops and coagulum, cooled, pitched with yeast, and fermented. The fermented brew, known as "green" or "ruh" beer, is then aged ("lagered") and clarified, filtered, and carbonated to produce the desired finished beer.

It is well known in the brewing art that when beer is exposed to light of wavelengths between about 300 nm and about 500 nm, the beer quickly develops a so-called "skunky" flavor, which is sometimes also referred to as "sunstruck" or "light struck" flavor. A considerable body of research has resulted in at least partial understanding of the chemical pathways involved. It is widely believed that the photochemical reaction sequence is initiated by the absorption of light by the presence of one or more of the several photosensitizers, e.g., flavins, especially, riboflavin, that are present in beer, which become excited, and, in their excited state, react with the bittering principles in the beer, isohumulones, to form 3-methyl butene thiol (3-MBT), which is understood to be the principal source of the skunky aroma. Only very small amounts of these sulfur-containing compounds are required to be present to impart the skunky flavor to the beverage and render it unacceptable. The riboflavin emanates mainly from the malt, to a minor extent via the hops used in the production of beer, and, according to common wisdom, the action of yeast during the fermentation. (See Tamer et al. *Enzyme Microb Technology* 10:754–56, December 1988.) This photochemical reaction is a problem that to some degree has been the subject of a diverse remediation.

More particularly, present understanding is that the reaction sequence is initiated by the absorption of light by riboflavin that is excited and, in its excited state, reacts with the bittering principles in beer, isohumulones, to form excited state isohumulones. The excited isohumulones then undergo a Norrish type I cleavage to give a 4-methyl-3-pentenoyl radical, which, in turn, fragments to carbon monoxide and a 3-methylbutenyl radical. The 3-methylbutenyl radical then reacts with cysteine or other suitable sulfur donors that may be present in the beer to form 3-MBT.

Excited isohumulones can, in principle, also be generated by direct absorption of ultraviolet light. The UV spectrum of trans isohumulone shows a small, but real, absorption of light of a wavelength between 300 nm and, approximately, 350 nm. Flint glass, although it absorbs all light below 300 nm, does not, therefore, completely protect isohumulones from direct UV excitation.

One approach that has been widely adopted relies on primary packaging coloration or opacity either to exclude light or, at least, exclude those wavelengths of light that are particularly problematic. Such attempts to prevent beverages from becoming skunky involve enclosing the beer in opaque cans or in bottles made of protective, i.e., colored, glass—brown or amber being the most efficient (see U.S. Pat. No. 2,452,968). These bottles reduce or eliminate the transmission to the beer of light having a wavelength shorter than about 560 nanometers. Such light is the most harmful because it assists the riboflavin in enhancing the production of the undesirable volatile sulfur compounds.

Brown bottle glass has become a standard for the brewing industry for avoiding the formation of skunky off-flavors, although in some circumstances green glass can be employed, generally with reduced efficacy.

Flint, or clear, glass—apart from the exclusion of a preponderance of ultraviolet wavelengths—is ineffective as packaging for traditional beer products that are susceptible to the formation of skunky off-flavors on exposure to visible wavelengths, although its use is desirable in order to permit the consumer to view the contents of the package.

More recently, chemically reduced isohumulones have been used for bittering in lieu of natural isohumulones. (See Verzele, M., et al., *U. Inst. Brew.* 73:255–57, 1967.) Since skunky thiol is not formed from these compounds, the resulting beers do not develop light struck flavor when exposed to light. Unfortunately, the bittering properties of the reduced isohumulones are not identical to natural isohumulones and, hence, this approach results in flavor modification.

Other methods involve adding light-stabilizing materials to the beverage. (See U.S. Pat. No. 4,389,421.) However, in some jurisdictions, the use of such compounds has not been approved. Further, many brewers are reluctant to use any additives at all, but, rather, use hops or hop extracts in an effort to achieve traditional beer flavor.

Another alternative has been suggested in U.S. Pat. No. 4,389,421. This patent describes malt beverages that have added organic compounds possessing a 1,8-epoxy group and, optionally, another compound having a 1,4-epoxy group. The amount of the 1,8-epoxy compound is at least 0.25 ppb and, preferably, about one to six ppb by weight. Suitable sources of the 1,8-epoxy compounds are said to include 1,8-cineole, or plant essences from cardamom, eucalyptus, peppermint, lavender, laurel, or star anise. A suitable 1,4-epoxy compound is said to be 1,4-cineole. It is taught that the addition of these compounds prevents the development of the "light struck" flavor in a range of malt beverages (for example, beer, ale, malt liquors, etc.).

The problem of skunky flavor has been the subject of research for many years, and such research continues. (See Sakuma et al., "Sunstruck Flavor Formation in Beer," *American Society of Brewing Chemists, Inc.*, 162–65, 1991). This article also deals with the part believed to be played by riboflavin in the reaction that produces the "skunky" flavor and suggests that removing riboflavin from the finished beer may solve the problem.

U.S. Pat. Nos. 5,582,857 and 5,811,144 disclose a process for the production of a hopped malt beer wherein a processing liquid containing riboflavin is hopped to form the desired beverage. The improvement comprises subjecting that processing liquid to an effective amount of actinic radiation of a wavelength adapted to decompose the riboflavin and thereby reduce the amount thereof, whereby a beer having enhanced light stability is obtained. "Process liquid" is defined as any unhopped wort or fermented wort (including green or bright beer) produced using malt.

U.S. Pat. No. 6,207,208, the disclosure of which is incorporated herein by reference in its entirety, is directed to the addition of an adsorbent clay to the process liquid of a brewing process to adsorb, and thereby remove, riboflavin present in the process liquid.

In that application, an improved process is provided for the production of a beer in which process a process liquid having a high riboflavin content is hopped to produce the desired beverage, wherein the improvement comprises treating the process liquid with an effective amount of a clay adsorbent, whereby the riboflavin content in the process liquid is reduced to less than 0.2 ppm, and the resulting beer has enhanced stability to light.

The clay employed as the adsorbent is a hydrated aluminum silicate or a hydrated aluminum-magnesium silicate. Examples of such clays that can be used include Fuller's earth, bentonite, kaolinite, illite, and halloysite, as well as mixtures thereof. Preferably the clay is attapulgite, montmorillonite, or mixtures thereof.

The literature teaches a process in which sake, a unique Japanese fermented liquor or wine has been subjected to a light treatment. See Japanese published Patent Application 67667 entitled, "Process for Production of Sake Hardly Affected by Microbial Deterioration." This reference teaches treating finished sake with light in the 200 to 700 micron range, the object being to have the light decompose riboflavin that is present in the finished sake, which riboflavin is an essential nutrient for lactic bacteria that is responsible for infectious spoilage in finished sake. As a consequence of the riboflavin destruction, the growth of the bacteria is inhibited and the sake preserved. Sake is, of course, a totally different product from beer, being an unhopped nonmalt product, produced from rice using a starch-digestive enzyme amylase obtained from a mold and a special sake yeast to effect the fermentation. As stated, these differences materially distinguish sake from all malt brewery beverages. Note, in particular, that riboflavin in sake, absent any lactic acid bacterial infection, does not pose off-flavor development problems, such as those that are typically associated with hopped malt-containing products, such as beer.

SUMMARY OF THE INVENTION

As stated above, in accordance with currently accepted brewing science, the compound that is thought to be primarily responsible for the skunky off-flavor is 3-methyl-2-butene-1-thiol, although it has been suggested that hydrogen sulfide and methyl mercaptan, among other compounds, may also contribute. This compound is believed to be formed when photochemical cleavage of side chains of hop-derived isohumulones is followed by the reaction of the resulting 3-methyl-2-butenyl radical with an undetermined sulfur-containing compound, possibly methionine or, more likely, cysteine residues from the proteins that are normally present in the beer. Riboflavin, which is contributed from both vegetable, e.g., barley, and, to a much lesser extent, yeast sources, is generally accepted as being a photochemical sensitizer in this reaction sequence.

In accordance with the present invention, it has been found that if the reaction that produces the thiol compound responsible for the skunky flavor in beer production can be prevented or interrupted, then the resulting beverage will have enhanced stability against light.

One means by which a chemical reaction can be prevented or interrupted is by making one or more of its required reactants unavailable, for example, by its removal or destruction, by the blocking of its reactive site(s), or by its diversion to a competing reaction that produces innocuous products. Thus, the unavailability of one or more of the important reactants necessary for the thiol formation; e.g., the riboflavin, isohumulones, or the unidentified sulfur-containing compound; or a reactive intermediate derived therefrom, will prevent or, at least, reduce the production of skunky flavor in beer upon exposure to light. For example, U.S. Pat. No. 5,582,857, the disclosure of which is incorporated herein by reference in its entirety, discloses an improvement in a process for the production of a hopped malt beer in which a processing liquid containing riboflavin is hopped to form the desired beverage, wherein the improvement comprises subjecting the processing liquid to an effective amount of actinic radiation having a wavelength greater than 300 nanometers and adapted to decompose the riboflavin, thereby reducing the amount thereof and obtaining a beer having enhanced light stability.

U.S. Pat. No. 5,811,144 describes an improvement in a process for the production of a beer wherein wort having a high riboflavin content is hopped to produce the desired beverage, wherein the improvement comprises treating the wort with an effective amount of actinic radiation adapted to decompose riboflavin and having a wavelength of from 300 to 700 nanometers; wherein during the treatment with the actinic radiation, the wort is maintained at a temperature of from about 25° C. to 90° C. and is substantially anaerobic; whereby the riboflavin content is reduced to less than 0.2 ppm and the resulting beer has enhanced stability to light.

In a preferred embodiment, the present invention is directed to means for reducing riboflavin concentrations in beer in order to improve its light stability. According to the present invention, it has been found possible to stabilize beer to the effect of light by photolyzing various brewing intermediates. In particular, enhanced light stability has been obtained by riboflavin decomposition via photolysis of sweet wort under both aerobic and anaerobic conditions, photolysis of hopped wort under aerobic and anaerobic conditions, photolysis during fermentation, photolysis of unhopped beer under aerobic and anaerobic conditions, and photolysis of hopped beer under aerobic conditions. Additionally, the application of krausening to light struck beer and the fermentation of photolyzed wort with a mixture of yeast and lactic acid bacteria that require riboflavin for growth has been found beneficial.

Wort produced in the usual manner from malt(s) typically has a relatively high riboflavin content (for example, about 0.4 ppm or more). As used herein, riboflavin contents above 0.2 ppm are defined as "high." In accordance with one aspect of the present invention, the riboflavin content is reduced to less than 0.2 ppm, that level being defined for use herein as an "insignificant" amount.

The present invention is directed to a process for the prevention of thiol formation in beer exposed to ultraviolet or visible light comprising removing or destroying at least one of the components present in the beer that are necessary for said thiol formation.

The formation of skunky thiol in beer follows clean first order kinetics. This means that a precursor (i.e., riboflavin) is being depleted via a first order pathway. When an unhopped beer is exposed to light under anaerobic conditions for an interval corresponding to that required for completion of skunky thiol formation, the riboflavin is depleted. This process will be referred to herein as "anaerobic photofinishing." Hops containing isoacids, i.e., isohumulones, can then be added and it has been found that no skunky thiol is generated upon subsequent light exposure. There are flavor changes in the beer associated with anaerobic photofinishing, but skunky thiol formation does not occur when the finished beer is exposed to visible light, i.e., wavelengths longer than about 390 nm.

Normally, isohumulone extracts are produced at a basic pH to improve the solubility of the extract. These, however, normally contain flavins and, while photochemical isomerization of basic isohumulone extracts is known in the art, it has now been found that an acidic extraction pH is necessary to avoid formation of lumichrome from the riboflavin so that subsequent photochemical isomerization results in a flavin-free extract suitable for use in this process.

The rate of photochemical riboflavin decomposition in beer and in wort is not significantly dependent on oxygen concentration. Oxygen, however, prevents skunky thiol development in beer during light exposure. It follows that riboflavin can be photochemically destroyed in a hopped beer without skunky thiol formation if an oxygen residual is maintained during the photolysis. This process will be referred to herein as "aerobic photofinishing." There are flavor changes in the beer associated with aerobic photofinishing, but skunky thiol formation does not occur when the finished beer is exposed to light under anaerobic conditions.

Further, skunky thiol is not produced when hopped wort is exposed to visible light during processing, and thus it follows that riboflavin can also be destroyed by photolysis during the fermentation step, either with or without oxygen injection.

In another aspect of the present invention, it has been found that the riboflavin can be destroyed by the action of bacteria. For example, beer fermentation employing a mixture of yeast and lactic acid bacteria results in a beer having a lower riboflavin content because the lactic acid bacteria that are present require riboflavin as a nutrient and, thus, take it up during the fermentation. This, again, results in a beer with enhanced light stability.

In yet another aspect of the present invention, the reactants in beer necessary to produce the skunky thiol, notably riboflavin, can be removed by adsorption to various surfaces. For example, in a method for the laboratory measurement of skunky thiol, it was found that the analysis can be carried out successfully only if the vessel used in the analysis is the bottle in which the beer went skunky or a vessel in which previous skunky thiol analyses had been performed. Consequently, when the vessel was cleaned by heating in a 400° C. muffle furnace prior to use, the recovery of skunky thiol was reduced by 99+ percent. It is believed that this is caused by the binding of the thiol to the glass. Therefore, it follows that a beer rendered skunky can be made "unskunky" by exposure to muffle furnaced glass, viz., by stripping skunky thiol from skunky beer by means of exposure of the beer or its headspace to muffle furnace activated ground glass. It is also expected that metal surfaces can similarly manifest such an adsorptive effect.

As employed herein, the term "process liquid" means any unhopped wort, fermented wort (including green or bright beer), or finished beer produced using malt.

Those skilled in the art will readily comprehend that the means for preventing the formation of skunky thiols from beer, or removing them, that have been mentioned above and others that may come to mind can in many instances be combined beneficially to yield even better results. For example, bottle glass, without anything more, has a typical green coloration. Flint is typically added to the glass in order to render the bottle glass optically clear. This practice has given rise to the expression "flint glass." In the beer packaging industry, the term "flint glass bottles" has become synonymous with "colorless" (i.e., free of visible color) glass bottles because flint is so much less expensive than other additives that are known to be fungible for this purpose. On the other hand, flint glass passes light at wavelengths that destabilize beer flavor chemistry. Cerium oxide glass and polycarbonate packaging are both known to block ultraviolet light. However, cerium oxide fluoresces, emitting light at riboflavin absorbing frequencies, which can also result in the development of the skunky off-flavor in hopped beer, thereby counting against its use as a primary packaging material for hopped beer. Polycarbonate, on the other hand, does not fluoresce as cerium glass does, but suffers from the drawback that it is normally applied as a coating to the bottle, creating problems both with respect to its application and with respect to recycling, especially in the case of returnable/reusable beer bottles. In accordance with the present invention, however, there is provided a beer packaged in a cerium oxide glass bottle, wherein the beer in the bottle has been riboflavin depleted by means such as those described herein. This means that the cerium oxide can replace the flint in the production of transparent glass and provide the added benefit of protecting the beer contained in these bottles from skunky flavor development via the ultraviolet route and, even though fluorescence occurs, the beer contained in the bottles does not develop skunky flavor because its riboflavin photochemistry has been disabled.

Thus, in one aspect the present invention provides a hopped malt beverage having enhanced light stability, with the beverage comprising hopped processing liquid, which processing liquid had a riboflavin content of less than 0.2 ppm during hopping.

In another aspect, the invention provides an improved process for the production of a beer in which a process liquid is hopped to produce the desired beverage, wherein the improvement comprises treating any process liquid having a high riboflavin content with an effective amount of actinic radiation having a wavelength greater than 300 nm and adapted to decompose riboflavin, wherein the riboflavin content is reduced to less than 0.2 ppm and the resulting beer has enhanced stability to light.

In another aspect, the present invention relates to an improved process for the production of a beer in which wort having a high riboflavin content is hopped to produce the desired beverage, wherein the improvement comprises treating the unhopped wort with an effective amount of actinic radiation adapted to decompose riboflavin and having a wavelength of from 300 to 700 nanometers; wherein, during said treatment with the actinic radiation, the wort is maintained at a temperature of from about 25° C. to 90° C. and is substantially anaerobic; whereby the riboflavin content is reduced to less than 0.2 ppm and the resulting beer has enhanced stability to light.

In another aspect, the present invention relates to an improved process for the production of a hopped malt beverage wherein a process liquid having a high riboflavin content is hopped to produce the desired beverage, wherein the improvement comprises treating the process liquid with an effective amount of actinic radiation from a lamp having a minimum power output specification as follows:

at least about 90 percent between about 300 and less than about 800 nanometers based on wavelength specific output power as measured in watts per square meter at a distance from the light source of three meters, whereby the riboflavin content is reduced to less than about 0.2 ppm and the resulting hopped malt beverage has enhanced stability to light.

In still another aspect the present invention relates to a hopped malt beverage having enhanced light stability prepared by a process comprising treating a process liquid having a high riboflavin content with an effective amount of actinic radiation from a lamp having a minimum power output specification as follows:

at least about 90 percent between about 300 and less than about 800 nanometers based on wavelength specific output power as measured in watts per square meter at a distance from the light source of three meters, whereby the riboflavin content is reduced to less than about 0.2 ppm and the resulting hopped malt beverage has enhanced stability to light.

In a preferred embodiment, the present invention is directed to an improved process for the production of a beer wherein a process liquid is hopped to produce the desired beverage, wherein the improvement comprises aerobically treating a process liquid for producing a beer having a high riboflavin content with an effective amount of actinic radiation having a wave length greater than 300 nanometers and adapted to decompose riboflavin, wherein the riboflavin content is reduced to less than 0.2 ppm and the resulting beer has enhanced stability to light.

In another preferred embodiment, the present invention is directed to a beer having enhanced stability to light produced by a process comprising treating a wort having a high riboflavin content with an effective amount of actinic radiation adapted to decompose riboflavin and having a wave length of from 300 to 700 nanometers; wherein, during the treatment with the actinic radiation, the wort is maintained at a temperature of from about 25° C. to 90° C. and is aerobic; whereby the riboflavin content is reduced to less than 0.2 ppm.

DESCRIPTION OF THE PREFERRED EMBODIMENTS

Figure 1:
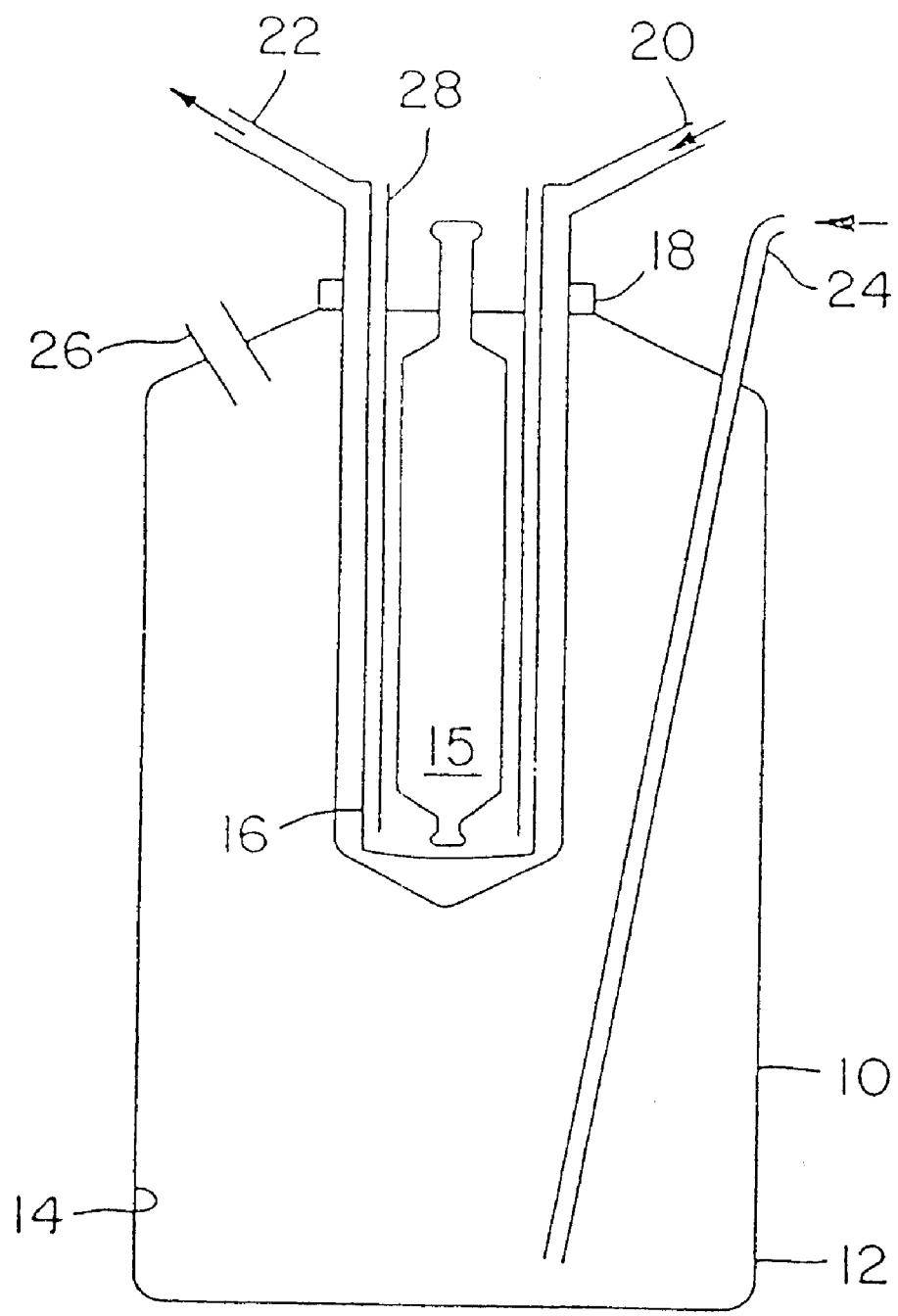
FIG. 1 is a simple diagrammatic cross section through a pilot scale reactor suitable for the batch irradiation of liquids.

Flavins, particularly riboflavin, when photochemically activated, are photosensitizers for the photochemical cleavage of side chains of isohumulones, which are also present in process liquid, to yield 3-methyl-2-butenyl radicals that react with a sulfur-containing compound in the brew—probably derived from an amino acid residue—to produce thiols, for example, 3-methyl-2-butene-1-thiol, which has a skunky aroma. In the absence of the flavin initiator, e.g., riboflavin, the rate of photochemical reaction is significantly reduced and the light stability of the product is thereby improved.

The present invention has special application to the production of a beer having enhanced stability to light. This stability can lead to an extended shelf life of 25 percent or more than is typical for regular, untreated, beer in situations where incident light causes deterioration of the product.

The present invention is directed to the removal or inactivation of one or more of the reactants that are present in beer that bring about the production of skunky thiols upon exposure of the beer to ultraviolet or visible light, or to the prevention of the light excitation of such reactants. Preferably, the invention is directed to the removal of flavin reactants, especially riboflavin. Removal can be effected by destruction, adsorption, precipitation, centrifugation, extraction, and the like. Destruction and adsorption are preferred. As used herein, the term "destruction" is intended to include a conversion of a reactive compound, or activated species thereof, to a different, inactive compound, as well as decomposition.

Very surprisingly, exposure to light, which generates the problem to be solved by the present invention, can, in a preferred embodiment, generate the solution, in that, in spite of the clearly counter-intuitive nature of the approach, the problem associated with riboflavin in process liquids can be reduced or eliminated by the deliberate and selectively timed use of a selected type and amount of actinic radiation to treat any such process liquid. This can be done either prior to or subsequent to hopping.

In one embodiment of the invention, therefore, it has been found that a reduction in the amount of flavin can be effected by subjecting a flavin-containing process liquid to the action of actinic radiation of a wavelength adapted to decompose the flavin. The so-treated process liquid is then finished to product in the usual manner by conventional brewing procedures.

The amount and type of radiation must be sufficient to produce significant decomposition, i.e., "destruction," of the flavin effectively, the "effective amount" as used herein being readily determinable by routine experimentation.

It has further been found, however, that there are significant advantages with respect to process efficacy when the wavelength output profile of the photon source is matched as nearly as possible to the wavelengths that affect the quantum state of the target molecular species—in the preferred case, riboflavin.

In connection with the foregoing, it has been found to be highly desirable to employ low-powered indium-doped arc lamps as photon sources, such lamps being outstanding with respect to the preferred power output distributions that are suitable for the purposes contemplated herein.

It is believed that reducing the amount of riboflavin to a relatively low level prior to hopping inhibits the formation of "skunky" flavor-imparting sulfur compounds, and hence is responsible for the enhanced light stability. Moreover, it has also been found that whether the amount of riboflavin is reduced prior to or subsequent to the fermentation stage of the brewing process, the same beneficial result is achieved. This is very advantageous and very unexpected since, as indicated above, those skilled in the art have always thought that significant levels of riboflavin reduction prior to fermentation would be ineffectual from a practical standpoint.

As employed herein, the term "actinic light" means light of a predetermined wavelength that is capable of stimulating certain chemical reactions, and, in particular, the decomposition, i.e., destruction, of riboflavin. Typically, the actinic light will have a wavelength greater than about 300 nanometers, and, generally, less than about 700 nanometers. It has been found advantageous to use light having a wavelength greater than about 340 nanometers, since radiation below these ranges may adversely affect other components of the processing liquids, causing their destruction and consequent adverse effects on the flavor of the product. The desired results are obtained most efficiently with radiation having a wavelength greater than about 340 nanometers, but less than about 550 nanometers.

It has been found that lamps having power output distributions of at least about 90 percent in the range of between about 300 nanometers and about 800 nanometers (as, for example, relatively low-power, indium-doped arc lamps) are particularly useful. Even more preferably, the lamp should have a power output of at least about 90 percent between about 300 and about 700 nanometers; especially at least about 60 percent between about 340 and about 550 nanometers; particularly at least about 50 percent between about 350 and about 500 nanometers; and most especially, greater than about 20 percent between about 410 and about 450 nanometers. All of the percentages set forth herein are based on wavelength-specific output power, as measured in watts per square meter at a distance from the light source of three meters.

The actual amount or "dose" of radiation is not critical, provided it is sufficient to effect the desired decomposition or reduction of the riboflavin content, resulting in the desired increase in light stability. Standard tests for the determination of riboflavin content are available and can readily be used to confirm that the desired reduction in riboflavin content has been achieved.

Process efficacy, on the other hand, is related to the proportion of the light energy that is available to effect the desired photochemical destruction of the target molecular species, as well as the extent to which collateral, but unintended, photochemical changes are avoided by the concentration of energy output into a relatively narrow bandwidth (although light filters could be used as an alternative means for managing this).

The beer-making process in which the flavin, e.g., riboflavin, or other reactants, is photochemically destroyed can be either a batch or a continuous one.

Where the process is a continuous one, it is preferred that it be of the kind described in U.S. Pat. No. 5,696,380, the disclosure of which is incorporated herein by reference in its entirety. The invention disclosed in that patent is a flow-through photochemical reactor comprising a fluid conducting channel. More particularly, the reactor includes a photon-transparent wall for admitting photons into the channel. The reactor further includes internally housed, static fluid-dynamic-effector means for passively inducing substantial transverse (i.e., radial) mixing flow within a fluid during its longitudinal transit through the channel. This substantially increases the uniformity of the fluid's exposure to photons radiating through the wall and into the channel.

The foregoing embraces, within its broad scope, a photon transparent tubular reactor (with mechanically static, fluid-dynamic effector elements disposed internally thereof) having light sources arranged externally of the channel, as, for example, in a radial array around the tube's exterior. To make the most efficient use of the photons emitted from a light source, however, it is preferred that the light source be located within the channel so that the photons can radiate outwardly therefrom, thus being directly available for reaction in the surrounding fluid flow.

Accordingly, the preferred flow-through photochemical reactor will include a reactor body, circumscribing a longitudinally extending channel having a generally annular cross-section. The channel accommodates the passage of fluids between an inner wall of the reactor body, and an outer wall of a photon transmitting tube. The tube is housed internally of the reactor, and is preferably arranged in co-axial alignment (i.e., a longitudinally centered, concentric relation) relative to the inner wall of the reactor.

This preferred reactor includes an arrangement of mechanically static, fluid dynamic elements. These "operate" by passively inducing or effecting a substantial turbulent flow within the fluid as it passes through the annular channel and this action substantially increases the uniformity of the fluid's exposure to photons radiating from a source within that tube into the fluid as it is conducted through the channel. Note, too, that these mechanically static elements can include those that can be manufactured from transparent materials.

Static effector elements suitable for use in the process of the present invention are known in the mixing arts where they are known as "static mixers." Exemplary forms of such mixers are disclosed in a variety of U.S. patents, as well as elsewhere, and although not all are equally well suited for use in the practice of the present invention, they each disrupt the streamline flow and, to that extent, are potentially relevant to the present combination. The benefit of the present "static effector" is directly tied to the efficiency with which it circulates flow toward and away from the surface(s) through which the photons are transmitted. The most efficacious flow pattern is one in which photon-exposed fluid is displaced or replaced by fluid that is either unexposed or less exposed than the fluid that it displaces or replaces in proximity to the photon-transmitting surface(s). Given the economic, and, hence, industrial, advantages that attend in-line, longitudinal flow processes, the efficacy of a given static effector is directly related to the degree to which a particular effector directs and redirects transverse (i.e., relative to the overall longitudinal flow of the fluid) flow toward the photon-transmitting surface(s) of the reactor.

Apparatus suitable for use in a batch process is shown in FIG. 1, wherein a 35-liter reactor, generally designated 10, comprises a circular housing 12 having an interior reflective surface 14. Extending down along the central axis of the housing is a one-kilowatt indium doped arc lamp 15 (available from Phillips), the lamp being secured in position in its housing 15 which itself is secured to the vessel lid 18. The housing 16 also includes circulation means for circulating a heating/cooling fluid, which enters via port 20 and exits via port 22. Generally speaking, the lamp has a power output distribution of:

- about 93 percent between 300 and less than about 780 nanometers;
- about 90 percent between 300 and 700 nanometers;
- about 63 percent between 340 and 550 nanometers;
- about 57 percent between 350 and 500 nanometers; and
- about 20 percent between 410 and 450 nanometers.

All of the above percentages are based on wavelength specific output power as measured in watts per square meter at a distance from the light source of three meters.

The reactor is also provided with a tube 24 through which a gas, such as, nitrogen, can be introduced into the reactor adjacent the interior base and a port 26 to allow the gas to vent following its carrying out a sparging action in the body of the liquid in the reactor. Mechanical stirring means (not shown) can be placed in the reactor to provide additional stirring if necessary or the sole stirring action if desired.

Other suitable apparatus arrangements for carrying out this embodiment of the skunky thiol removal of the present invention will be readily apparent to those skilled in the art.

Beer that is not treated by the process of the present invention and that has been bottled in clear flint glass, green glass, and the like, and subjected to strong light, for example, sunlight or artificial light indoors, can develop an unacceptable skunky flavor within minutes, often as little as 20 minutes. The skunky flavor is readily discernible by experienced taste panelists who routinely make quality control evaluations in beer products. Such panels have descried that beverages treated by the means of the present invention do not develop the same degree of skunky flavor for about 16 hours of light exposure and, in fact, may not do so for as long as 20 to 30 hours or more.

Generally, hops or hop pellets are used to ensure that the "traditional" beer taste is obtained. Although there is a small amount of riboflavin in hops and hop pellets, it is insignificant as taught herein. However, even that small riboflavin content can be removed, if desired. Moreover, hop extracts can be substituted for the hops or hop pellets. Such extracts do not contain any riboflavin and, hence, can be used to advantage in the present invention.

Additionally, the yeast pitched to commence fermentation may include some small amount of riboflavin, but, again, this amount should not be sufficient to affect the present invention adversely. However, it is advantageous to use a yeast that is substantially free of riboflavin or at least is riboflavin-deficient.

It is preferred that at least 90 percent, more preferably 95 percent, and most preferably substantially all, of the riboflavin be removed from the process liquid, although reductions in excess of as little as 50 percent can be useful. In practice, this means the process liquid, after treatment and prior to hopping, may, if wort, have a maximum riboflavin content of less than about 0.2 ppm, preferably less than about 0.1 ppm, and more preferably less than about 0.05 ppm. It also means that the process liquid, if it is a fermented liquid, may have a maximum riboflavin content of less than about 0.15 ppm, preferably less than about 0.1 ppm, more preferably less than about 0.07 ppm, and most preferably less than about 0.03 ppm.

The desired hopped malt beverage can be produced using generally well-known brewing procedures adapted, where necessary, to incorporate the required riboflavin reduction stage, preferably by the light or adsorption treatments of the present invention at an appropriate stage. Consequently, an all-malt or a malt-plus-adjunct combination can be used as a starting substrate, as desired.

The skunky thiol reduction means of the present invention can be employed in any known commercial brewing process, including both batch and continuous processes. It can also be used in combination with other means for reducing riboflavin content, such as the means described in U.S. Pat. No. 5,582,857, incorporated herein by reference.

The decomposition of the riboflavin proceeds faster at elevated temperatures. Consequently, it is advantageous to treat the wort as soon as it exits the mash tun, at which point its temperature is normally as high as about 90° C. This has the additional benefit of ensuring the clarity of the wort with no trub formation, factors that assist treatment with light.

Although the dose rate, as mentioned above, is not critical, higher rates do minimize the time required to effect the light treatment stage and are, thus, preferred, especially when the process liquid is being treated in a continuous process.

The advantages and the important features of the present invention will be more apparent from the following examples.

EXAMPLE 1

Figure 2A:
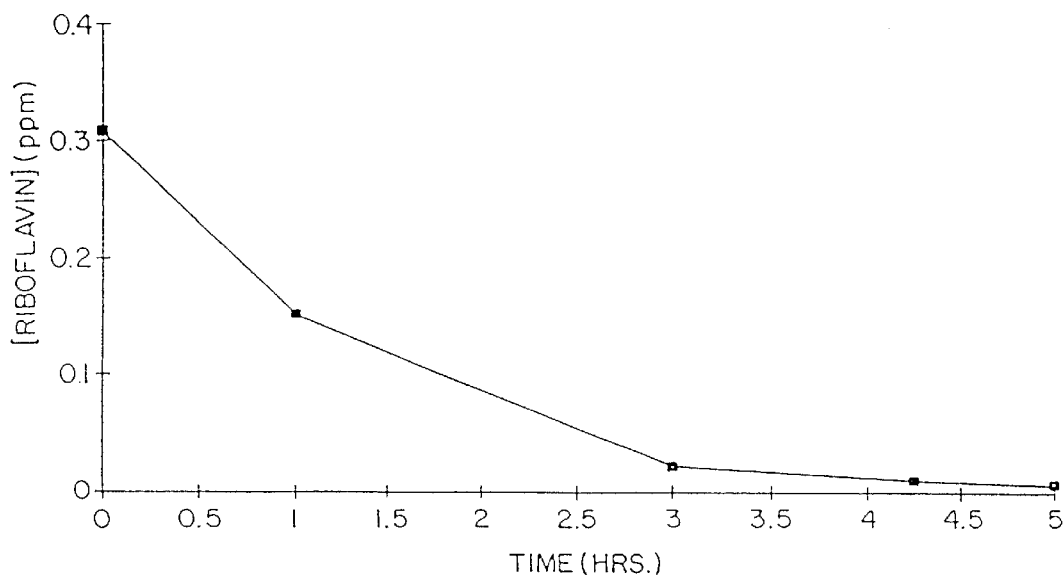
FIGS. 2a and 2b are graphs showing the elimination of riboflavin from an unhopped wort under the influence of actinic radiation.

Unhopped (sweet) wort from commercial lager production was kept at an elevated temperature (70° C.) until it was transferred to a batch scale reactor, similar to that shown as 10 in FIG. 1 except that the light source was a 450 watt medium pressure mercury vapor lamp, Hanovia lamp (Ace Glass Inc. #7825). Silicon anti-foam was added (0.3 milliliter) and the wort purged with nitrogen, which also generated turbulent mixing. After 25 minutes of sparging to reduce oxygen content, the agitated wort was irradiated. The effect of the irradiation was monitored by evaluation of riboflavin concentration by an HPLC method similar to that described by W. Moll in Frontiers of Flavour, Proceedings of the 5th International Flavour Conference, Porto Kerras, Chalkidiki, Greece, Jul. 1–3, 1987. FIG. 2a shows the loss of riboflavin in the wort. The loss of riboflavin ($R_b$) appears to follow approximately first order kinetics—that is:

$$\frac{-d[R_b]}{dt} = k[R_b]$$

where k is the pseudo first order rate constant and varies with temperature, lamp power output, oxygen content and reactor design.

Note that riboflavin does not appear to be photo-catalytic, since it is consumed in the photo-production of the off-flavor sulfur-containing compounds, which are believed to be thiols. Thus, low residual levels of riboflavin can, at least to some degree, be tolerated without unduly compromising the flavor of the beer. Such low levels of riboflavin, which can be readily determined experimentally using the taste panel route, are referred to herein as being "insignificant amounts."

Figure 2B:
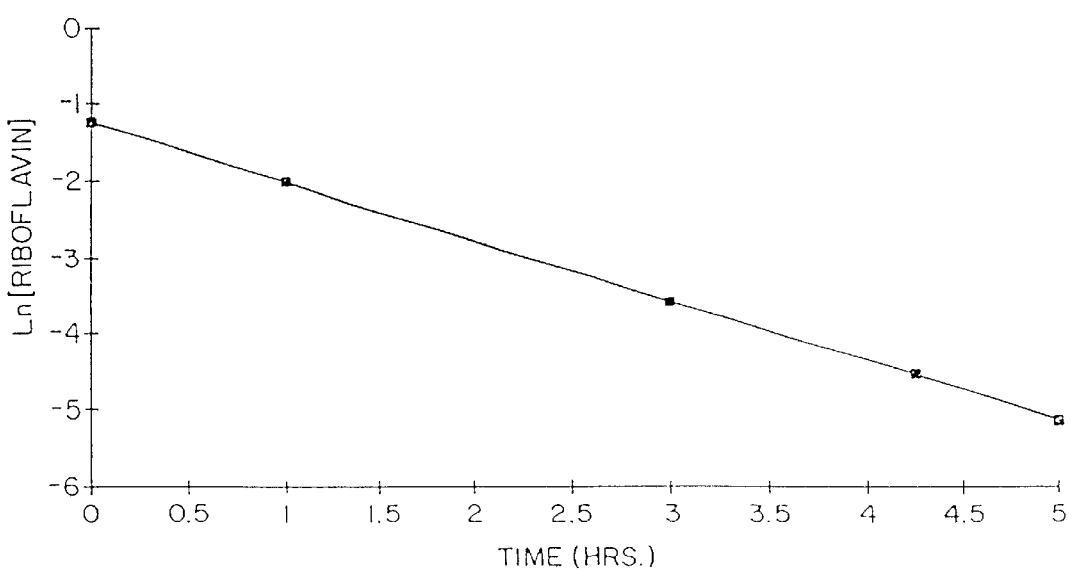

In this example, the rate constant is given as the negative slope of the graph shown in FIG. 2b which is −0.0129 min$^{-1}$. Thus, in 300 minutes, the riboflavin concentration as depicted in the graph had been depleted from 0.31 ppm to 0.007 ppm or by approximately 98 percent. If desired, the theoretical energy requirements can readily be calculated, and this may provide some guidance in selecting optimal equipment and light processing conditions.

Figure 3:
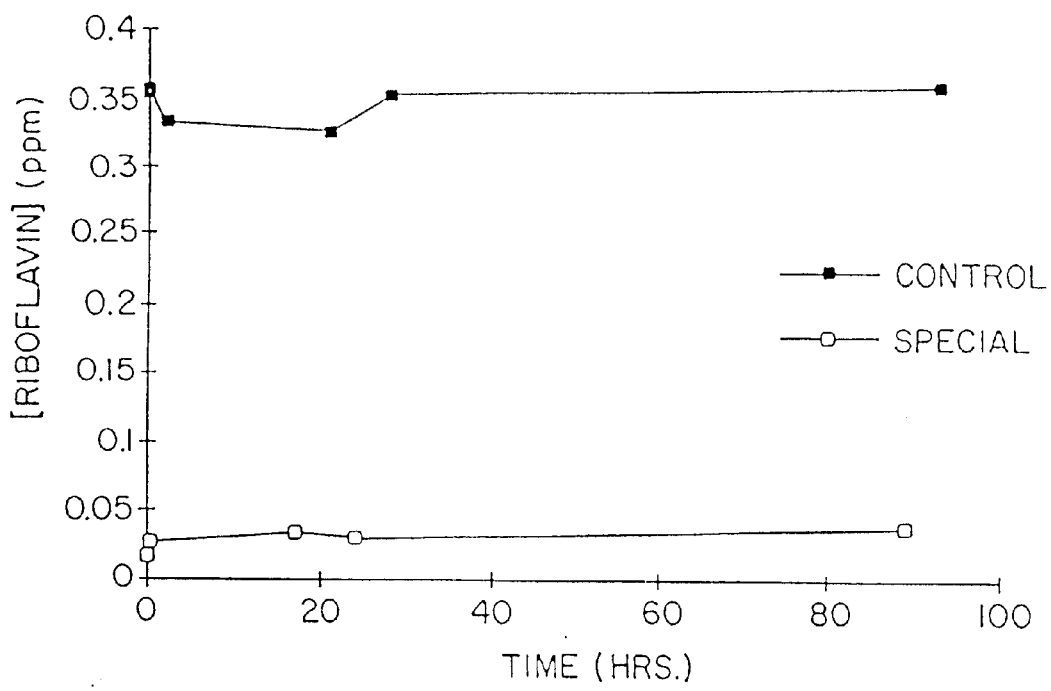
FIG. 3 is a graph showing the concentration of riboflavin during the fermentation of light-treated wort and untreated wort as the control.

Wort treated in accordance with the process of the present invention and a 35 liter batch of standard untreated wort (as a control) were each brewed to produce a beer according to standard pilot plant procedure. Riboflavin concentrations were measured at strikeout (0.019 ppm) and after pitching (0.027 ppm) with a standard lager yeast grown in synthetic media and washed twice with distilled water. As can be seen, riboflavin concentration increased slightly, presumably because of riboflavin present in the pitched yeast and in the hops, and the fermentations were monitored. The results are given in FIG. 3. At dropping, the riboflavin concentration was 0.070 ppm for the treated wort and 0.395 ppm for the control. The finished beer produced using wort treated in accordance with the present invention possessed a riboflavin concentration of 0.032 ppm (13 percent relative to control) and of 0.25 ppm for beer produced from untreated wort.

The treated and control beers were bottled in flint glass, and oxygen was carefully excluded on sealing. The beers at 4° C. were then evaluated for light stability by irradiating the bottles with visible (actinic) light from a 100-watt tungsten filament light bulb located at a distance of 20 centimeters. The beers were irradiated for the various times given in Table I below and then evaluated by experienced taste panelists. The results represent the average evaluations recorded by the panelists. The terms used describe the degree of skunky flavor observed, "strong" indicating unacceptable and "trace" meaning still acceptable.

TABLE I

| Time Irradiated (hours) | Control Beer | Treated Beer |
| --- | --- | --- |
| 2 | Strong | none |
| 4 | Strong | trace |
| 8 | Strong | trace |
| 16 | Strong | trace |

As can be seen from Table I, the beer produced without the light treatment of the present invention exhibited a strong, i.e., unacceptable, skunky flavor within less than two hours of irradiation, whereas the beer made utilizing the light treatment of the present invention exhibited only a trace of skunky flavor and was still acceptable even after it had been irradiated for 16 hours. In repeat experiments, irradiation for periods in excess of 20 hours produced the same effect. These results clearly indicate that the beer irradiated in accordance with the present invention has enhanced light stability.

Figure 4:
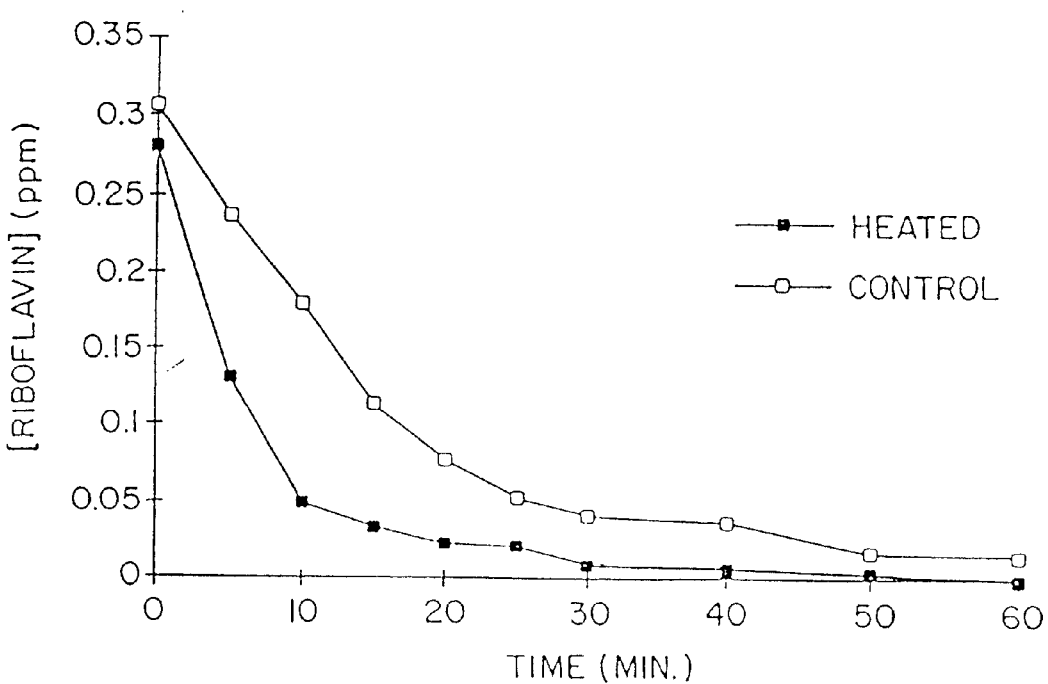
FIG. 4 is a graph showing the rate of destruction of riboflavin in wort by light treatment at two different temperatures.

The photochemical decomposition of riboflavin proceeds faster at higher temperatures, as is demonstrated by the photolysis of wort containing riboflavin at different temperatures (refer to FIG. 4). In this test, one liter of normal production unhopped sweet wort was heated to 70° C., then irradiated. A second liter of the same wort was irradiated at a control temperature of 20° C. As is clearly demonstrated in FIG. 4, the rate of destruction of riboflavin is greatly increased at the higher temperature.

Figure 5:
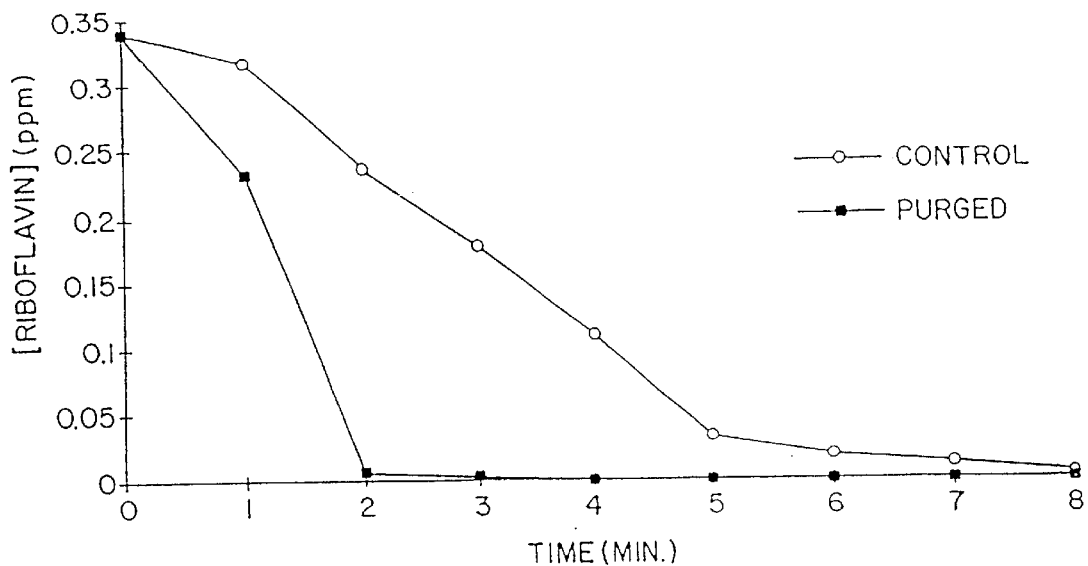
FIG. 5 is a graph showing the difference in the rate of destruction of unhopped riboflavin by the light treatment in aerobic and anaerobic conditions.

To demonstrate the desirability of excluding oxygen from the process liquid where the irradiation step is carried out prior to hopping, two similar aqueous riboflavin solutions at buffer pH 4, only one solution being prior purged with helium for 30 minutes to remove any dissolved oxygen, were each irradiated. The results are shown in FIG. 5. As can be seen, destruction, i.e., reduction or even elimination of riboflavin was achieved much sooner in the purged solution, clearly showing the desirability of reducing or even practically eliminating oxygen from process liquids being light treated prior to hopping according to the present invention.

Figure 6:
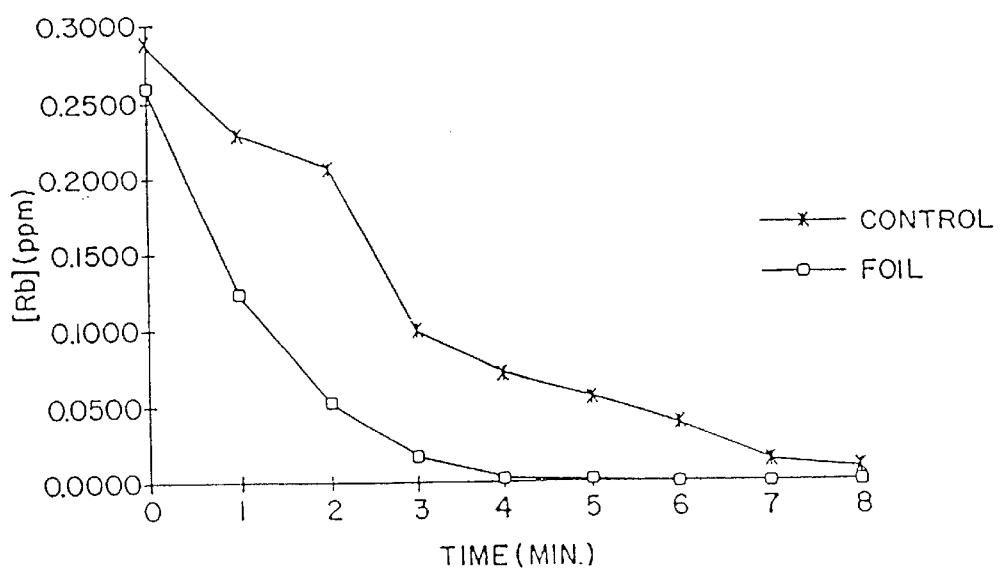
FIG. 6 is a graph showing the effect of increasing the dosage rate of the light treatment on the destruction of riboflavin in model solutions by using a reflective foil.

The reactor design can be made more efficient by including a reflective inner surface 28 (refer to FIG. 1) which reflects light that is not immediately or directly absorbed and thereby increases the effective dosage rate. This effect is demonstrated by reference to FIG. 6. Here, two 300-milliliter solutions of riboflavin in a pH 4 buffer were irradiated. One solution had a reflective foil in place around the container and the other one did not. As can be seen, the rate of elimination of riboflavin is effectively increased by a factor of three by use of the reflector system.

EXAMPLE 2

Control Hopped Lager

For use as a standard for light stability comparison, a control lager was brewed on a 40 L scale using production sweet wort obtained from the brewery. The wort was hopped in the kettle, then fermented, aged, and filtered. After dilution to 5.0 percent alcohol (v/v), the beer was carbonated and bottled in emerald green glass.

Riboflavin, after bottling, was 242 ppb (parts per billion). The beer contained 12 ppt (parts per trillion) 3-MBT and the flavor, as judged by the taste panel, was acceptable.

In order to assess its light stability, the beer was exposed at 4° C. to cool-white fluorescent light at intensities typical of those used in retail glass doored refrigerators. The light was filtered through polycarbonate screens to eliminate light of wavelengths shorter than 390 nm and thus preclude the possibility of direct excitation of isohumulones and the resulting formation of 3-MBT. 3-MBT was measured after 1, 3, and 7 days and was found to be 121, 241, and 382 ppt. After 3 days of light exposure, the riboflavin had been reduced to 193 ppb. The panel compared the beers exposed for 3 days to an unexposed control and judged the exposed beer to be intensely skunky. Since the threshold for 3-MBT in beer is 7 to 35 ppt, this is to be expected. Also noted in the light exposed beer were other strong off- flavors, which were described as "burnt rubber," "rotten," and "oxidized."

Experimental Details

Pilot-Scale Brewing Procedure

1. Sweet Wort Collection

Sweet wort was collected from the Brewhouse after lautering. The wort was collected after the grain bed had been established in the tun and approximately 20 percent of the sweet wort had passed through the Grant. The Plato was adjusted to 14.4° and the pH was adjusted to 5.1.

2. Kettle Boil

The sweet wort (61 liters) was placed in the pilot plant kettle and brought to a boil. The time was recorded as Start of Boil (SOB). At the SOB, 50.0 grams of bittering hops (Nugget) was added. After the wort had boiled for thirty minutes, 52.0 grams of aroma hop (Hallertau Hersbrucker) and 4 grams of carrageen (in the form of Irish Moss) were added and the wort was boiled an additional 15 minutes. The wort was transferred to a Hop Jack and allowed to sit for 10 minutes. During this time, the Hot Break formed and the insoluble hop material settled out. The clarified wort was passed through a plate chiller to cool it to 16° C.

During kettle boil, an evaporative loss of approximately 10 percent occurred. This yielded wort with a Plato of 16° and a pH of 5.1.

3. Fermentation

The cooled wort (30 Liters) was collected in a stainless fermentation vessel. Yeast was pitched at 0.45 percent w/v, and the wort was oxygenated to 16 ppm $O_2$. The fermentor was placed in a temperature controlled water bath at 16° C. for seven days.

4. Maturation

The fermentor was transferred to a 4° C. cold room for 24 hours to cause the yeast to flocculate. The liquid was siphoned off the yeast into a Corniliousis vessel. The can was sealed, flushed with $CO_2$, and placed on a $CO_2$ header for one week of cold storage.

5. Finishing

The beer was filtered using a Sparkler Filter fitted with diatomaceous earth impregnated pads. The beer was diluted to 5 percent ethanol, carbonated to 22 psi $CO_2$ pressure and then bottled and pasteurized in a tunnel pasteurizer. The beer was then placed in cold storage, in cartons that protected the bottled beer from light.

Dissolved oxygen levels as measured with a Digox oxygen sensor were less than 60 ppb.

6. Light Exposures for Light Stability Assessment

Beers were placed in a rectangular sectioned black box and subjected to a light source, which was a 40 watt cool-white fluorescent light flanked by polycarbonate screens. The intensity of the light as measured with a hand held luminometer (Cooke details) was 750 Lux. The apparatus and the samples were located in a cold room (4° C.) and the heat produced by the lamp was dissipated with cooling fans.

7. Riboflavin Measurement

Riboflavin was measured by HPLC using a fluorometric detector. The buffer was 165 mM ammonium formate buffer, pH 5.5, mixed 85 percent to 15 percent with acetonitrile. The flow rate was 1 mL/min. The injector was the AS3000/3500 and it was set at 10 $\mu$L. The column that was used was a Merck 50418 set at ambient temperature. A Waters 474 fluorescent detector was set at excitation 442 nm and the emission at 520 nm. The calibration range was 2 to 500 ppb and the RSD of six replicates at 2 ppb was 3.5 percent.

8. Measurement of 3-Methyl-2-Butenethiol

The concentration of 3-methyl-2-butenethiol (3-MBT) in light exposed beer was measured employing the technique of purge and trap analyte isolation coupled with quantification by isotopic dilution GC/MS. The internal standard utilized was $\alpha$-$d_2$ 3-methyl-2-butenethiol, which was prepared from 3,3-dimethyl acrylic acid via reduction with lithium aluminum deuteride, followed by bromination, conversion to the isothiouronium salt, and subsequent alkaline hydrolysis. Instrumentation required for the method included a Tekmar 2000 purge and trap concentrator equipped with a cryofocusing unit, Hewlett-Packard 6890 gas chromatograph, and a Hewlett-Packard 5793 mass selective detector.

To conduct a typical analysis, 300 mL of the sample was transferred to a 341 mL purge vessel equipped with deactivated silica lines for a purge gas inlet and a volatiles outlet. The sample was purged with a stream of dry helium for 60 minutes at a flow rate of 40 mL/min, during which time the volatile constituents in the beer were transferred from the sample headspace and adsorbed onto a Tennax TA glass lined trap located in the purge and trap concentrator. Desorption was carried out for 5 minutes at 180° C., followed by cryofocusing at −180° C. and injection onto the gas chromatograph at 200° C. The GC was equipped with a J&W DB-Wax capillary column (30 m×0.25 mm×0.5 $\mu$m) to effect the separation of the 3-MBT and $\alpha$-$d_2$ 3-MBT from the beer volatiles, with the oven temperature ramp programmed as follows: 30° C. for 5 minutes, 5° C./min to 100° C., 30° C./min to 250° C. for a final hold of 6 minutes. The compounds of interest eluted under the above conditions, with retention times of 23.2 minutes for $\alpha$-$d_2$ 3-MBT and 23.3 minutes for 3-MBT. The mass selective detector was operated in SIM mode at 70 eV at a temperature of 230° C. Ions 102 and 104, the M+ ions from 3-MBT and $\alpha$-$d_2$ 3-MBT, respectively, were monitored exclusively during the gas chromatograph run. The ratio of the 102 to 104 ion peak area abundances was used to calculate the amount of 3-MBT present in a particular beer sample as the amount of the $\alpha$-$d_2$ 3-MBT added to the beer and the detector response ratios are known. Calibration was performed in beer packaged in amber bottles, encompassing a range of 3-MBT concentrations from 1 to 550 ng/L. The RSD was calculated at 18.7 percent from seven replicate analyses of the same beer brand bearing the same bottling date spiked with 1 ng/L of authentic 3-MBT. The MDL was calculated to be 0.2 ng/L. (11 ppt.)

9. Flavor Assessment

Exposed beers along with the same beer unexposed as a control were presented to a special taste panel. The panel judged whether or not the exposed beer was light struck and noted any other off-flavors. The identities of the samples were withheld from the panel.

EXAMPLE 3

Aerobic and Anaerobic Sweet Wort Photolysis

Since most of the riboflavin present in beer is derived from malt, sweet wort contains this riboflavin. Photolysis of sweet wort should, therefore, yield beer with largely depleted riboflavin. The present inventors previously reported that this is effective and that the preferred embodiment was photolysis under anaerobic conditions. This preference stemmed from the observation that, in model buffers, photochemical decomposition of riboflavin was retarded substantially by the presence of oxygen. The kinetics of riboflavin destruction in sweet wort was subsequently examined. Riboflavin degradation was found to follow a clean first order rate law. The effect of sparging with air versus helium, however, was small. The difference in observed rate constants is less than 10 percent. Accordingly, beers were brewed with sweet wort photolyzed under both aerobic and anaerobic conditions. This was done by injection of air during the photolysis (aerobic) and by injection of argon and maintaining an argon blanket during the photolysis (anaerobic). Dissolved oxygen levels during the photolysis were 40 to 60 ppb for the argon purged wort and 5 to 5.5 ppm for the air purged wort. The light source used for these photolyses was a 2 kW indium halide doped low pressure mercury lamp. Riboflavin levels before and after the photolyses for the air purge were 204 ppb and <2 ppb, respectively. For the argon purged photolyses, the riboflavin concentration before photolysis was 171 ppb and was 6 ppb afterward.

The finished beer obtained from the aerobic wort photolysis had 26 ppb riboflavin and a 3-MBT concentration of 26 ppt. After 1, 3, and 7 days of light exposure, 3-MBT levels of 30, 52, and 82 ppt, respectively, were obtained. The panel judged the 3-day exposed beer to be mildly skunky and have other mild, burnt, sulfur-like off-flavors.

The finished beer from the anaerobic photolysis was very similar. It had 30 ppb riboflavin and a 3-MBT concentration of 25 ppt. Exposure to light gave 25, 53, and 85 ppt skunky thiol after 1, 3, and 7 days exposure. The panel judged the exposed beer to be mildly skunky and to have other sulfur-like off-flavors.

Relative to the control hopped beer of Example 2, both beers had enhanced light stability.

Experimental Details

1. Aerobic Sweet Wort Photolysis

Sweet wort was collected as described above in Example 2 and placed in the kettle.

The sweet wort was reheated to 80° C. The kettle was fitted with a mechanical stirrer and a 2 kilowatt indium halide doped lamp. The kettle was covered with aluminum foil to help maintain the appropriate atmosphere above the kettle. To ensure that the sweet wort remained saturated with oxygen, an oxygen gas feed line was added to the kettle. The gas flow was set at 100 mls per minute. Once the wort was at temperature, the lamp was energized and the wort photolyzed for 60 minutes.

After the photolysis, the lamp, stirrer, and the oxygen line were removed from the kettle.

The procedures for Kettle Boil, Fermentation, Maturation, and Finishing described in Example 2 were followed to produce this beer.

2. Anaerobic Sweet Wort Photolysis

The production of the beer was the same as for the Aerobic Sweet Wort Photolysis, except that argon was used the purge the wort. The photolysis was started when the oxygen level was below 40 ppb.

3. Riboflavin Kinetics

Production sweet wort (1.5 L) was filtered at room temperature through Whatmann No. 4 filter paper and 1 L was placed in a 1 L Pyrex media bottle fitted with a sintered glass sparging rod, a gas outlet, and a magnetic stirring bar. After addition of antifoam, 1 mL of tri-n-butyl phosphate, the vessel was immersed in a glass walled water bath thermostated at 40° C. and equilibrated by sparging with either helium or air. A medium pressure mercury arc lamp (400 watts, Hanovia) was positioned 15 cm from the reaction vessel behind a polycarbonate light filter. Aliquots were removed at appropriate intervals from the stirred solution and the riboflavin concentration was measured. The results when plotted as log [Riboflavin] vs time gave a straight line, which indicates that the reaction was first order in riboflavin. When the sparge gas was helium, the rate constant was $-1.69 \times 10^{-3}$ min$^{-1}$. Sparging with air gave a rate constant of $-1.84 \times 10^{-3}$ min$^{-1}$.

4. Wort Photolysis

The kettle (60 L) was fitted with a mechanical stirrer and a 2 kilowatt lamp (Phillips, indium halide doped low pressure mercury) housed in a pyrex water cooling jacket. The wort was heated to 80° C. by the steam jacket on the kettle. Once the wort was at temperature, the lamp was energized and the wort was photolyzed. Samples were taken from the kettle at 15 minute intervals and the riboflavin concentration was determined by HPLC.

These results indicate that the concentration of riboflavin had been decreased to between 1 and 5 ppb during 60 minutes of photolysis at 80° C. using the Pilot scale photolysis unit and the destruction followed a first order reaction rate.

EXAMPLE 4

Aerobic and Anaerobic Photolysis of Hopped Wort

Experiments were performed to determine whether or not hopped wort develops skunky thiol when exposed to light. Hopped production wort was deaerated, carbonated, and bottled. The dissolved oxygen level was 50 ppb. The wort had an initial 3-MBT level of 14 ppt and, after 1, 3, and 7 days exposure, gave measured 3-MBT concentrations of 125, 134, and 200 ppt. Remarkably, the panel did not detect any skunky flavor in the exposed wort.

In order to see if skunky thiol generated in hopped wort would emerge in finished beer, production wort was photolyzed under the aerobic and anaerobic conditions described for the sweet wort photolysis. Aerobic photolysis resulted in a reduction of riboflavin from 218 ppb to 4 ppb. Under anaerobic conditions the riboflavin was reduced from 171 ppb to 6 ppb. The finished beers had, respectively, 18 ppb and 29 ppb riboflavin along with 117 and 93 ppt 3-MBT. The panel found no trace of skunky off-flavor in either beer. Neither did they find any other noticeable off-flavors. Upon subsequent exposure to light, the beer derived from aerobic photolysis gave, after 1, 3, and 7 days, 117, 167, and 209 ppt 3-MBT, respectively. This corresponds to increases of 0, 50, and 92 ppt 3-MBT. The sample exposed for 3 days was found to be mildly skunky by the panel and to have mild levels of the usual sulfur-like, burnt off-note. Beer prepared from anaerobically photolyzed hopped wort had 93 ppt 3-MBT after bottling and gave, after 1, 3, and 7 days light exposure, 162, 185, and 328 ppt 3-MBT, respectively. This corresponds to increases of 69, 92, and 235 ppt 3-MBT. The panel found no skunky off-flavor in the 3-day exposed sample, but detected moderate levels of other off-flavors.

Relative to the control hopped lager of Example 2, the beers both had enhanced light stability.

Experimental Details

Photolysis of Hopped Wort

1. Post Kettle Aerobic Hopped Wort Photolysis

Hopped bitter wort was collected from the cooler of the production facility. This wort was placed in the Pilot Brewery kettle, and heated to 80° C. The wort was photolyzed for 60 minutes, as described above in Example 3 for the Aerobic Wort Photolysis.

The wort was then brought to a boil and boiled for 10 minutes, whereupon it was processed through the rest of the Pilot Brewery Fermentation and Finishing process as described above for hopped products.

2. Post Kettle Anaerobic Hopped Wort Photolysis

Hopped bitter wort was collected from the cooler as above. The wort was purged with argon and photolyzed for 60 minutes as described above in Example 3 for the Anaerobic Wort Photolysis.

EXAMPLE 5

Aerobic and Anaerobic Photolysis of Unhopped Beer

The formation of 3-MBT over time in production hopped lager exposed in the light stability assessment apparatus (40 watt cool white fluorescent light with polycarbonate light filters) was monitored. It was found that the rate of formation of 3-MBT decreases with time and that the reaction appears to approach completion after 2 weeks. The rate of loss of riboflavin was found to follow a similar pattern.

In a separate experiment, no measurable loss of isohumulones was observed over one week light exposure in the same apparatus. Collectively, these results suggest that depletion of a beer component other than isohumulones and probably riboflavin is responsible for the declining rate of 3-MBT formation. Further, the results suggest that photolysis of an unhopped beer followed by the addition of isohumulones should give beer with natural isohumulones that does not develop 3-MBT upon subsequent light exposure.

Accordingly, two unhopped beers were brewed and photolyzed under aerobic and anaerobic conditions, respectively. The aerobic photolysis reduced riboflavin from 183 ppb to 35 ppb, while the anaerobic photolysis reduced it from 225 to 50 ppb. The beers were bittered with Steiner isomerized hop extract such that they had 12 ppm isohumulones—the same concentration as was present in the control hopped lager of Example 2. The beer made with aerobic photolysis had 17 ppt 3-MBT prior to subsequent exposures of 1, 3, and 7 days, after which the 3-MBT levels were 21, 18, and 49 ppt, respectively. The taste panel noted an oxidized, malty character in the beer prior to exposure. After 3 days exposure, the panel did not detect any 3-MBT, but noted a weak metallic, sulfur-like, off-flavor. The beer that resulted from anaerobic photolysis had a finished 3-MBT level of 42 ppt. 3-MBT levels of 38 ppt, 45 ppt, and 87 ppt were obtained after 1, 3, and 7 day exposures. The panel described the beer prior to subsequent exposure as having oxidized, rotting, and burnt rubber characters. After 3 days of light exposure, 3-MBT was not detected by the panel, but they did detect a general increase in metallic sulfitic character.

From the standpoint of resistance to 3-MBT formation, both beers had enhanced light stability when compared to the control hopped lager of Example 2.

Experimental Details
1. Aerobic Photolysis of Unhopped Beer

Two pilot brewer unhopped lagers were prepared, but not bottled, and transferred to the Photofinishing Reactor. An air cylinder was fitted to a gas inlet line and the beer was photolyzed until the riboflavin concentration was 50 ppb. The beer was then deaerated, carbonated, and bottled.
2. Anaerobic Photolysis of Unhopped Beer This beer was produced in a similar manner to that described above for aerobic photolysis, except that carbon dioxide gas was connected to the gas inlet line to provide mixing and removal of oxygen.

EXAMPLE 6

Aerobic Photolysis of Hopped Beer

The effect of dissolved oxygen on the light stability of hopped production lager bottled in emerald green glass was examined. The beers were opened, the headspace was exchanged for air and the bottles were recrowned. After equilibration, the dissolved oxygen levels were measured and found to be 7 to 8 ppm. Beers so treated were exposed in the light stability measurement apparatus for 10 days. 3-MBT and riboflavin were measured at appropriate intervals. The results are listed in Table II. The data clearly show that oxygen prevents the accumulation of 3-MBT during even extended light exposures. It does not, however, prevent riboflavin decomposition. It follows, then, that a riboflavin-free beer that is not light struck should be available via photolysis of aerated hopped beer.

TABLE II

Riboflavin and 3-MBT Concentrations versus Time in Aerated Hopped Lager Bottled in Emerald Green Glass and Illuminated with a 40 watt Cool-White Lamp

| Time (days) | [Riboflavin] (ppb) | [3-MBT] (ppt) |
| --- | --- | --- |
| 1 | 174 | 51 |
| 3 | 155 | 36 |
| 5 | 138 | 63 |
| 7 | 135 | 11 |
| 10 | 108 | 12 |
| 17 | 65 | — |
| 19 | — | 46 |

A hopped lager, brewed on the pilot scale was aerated in the photolysis apparatus used in the photolysis of the unhopped beers. The riboflavin concentration prior to light exposure was 185 ppb and the final concentration was 2 ppb. The beer was then deaerated and carbonated via a series of pressurizations with carbon dioxide followed by ventings. The finished beer had a dissolved oxygen concentration of 60 ppb and 3-MBT concentration of 19 ppt. Light stability evaluation gave after 1, 3, and 5 day light exposures, 24, 20, and 28 ppt 3-MBT respectively. When the beer exposed for 3 days was paneled against the control, the panel found neither skunky. The control was described as being oxidized, meaty, and malty, whereas the 3-day exposed beer was described as being sweet, sour, oxidized, and metallic.

From the standpoint of resistance to 3-MBT formation, this beer had enhanced light stability when compared to the control hopped lager of Example 2.

Experimental Details

Aerobic Photofinish, Hopped Lager

Hopped production lager was treated in the same way as the aerobic photofinished unhopped beer of Example 5.

EXAMPLE 7

Anaerobic Photolysis of Hopped Lager Followed by Krausening

In the beer made with anaerobic photolysis of hopped wort (Example 4), it was found that the finished level of 3-MBT was lower than expected, based on data gleaned from exposures of bottled deaerated hopped wort (200 ppt MBT after 7 days in the light stability evaluation apparatus). It was theorized that yeast may take up 3-MBT during fermentation. This result suggested that secondary fermentation (krausening) might serve as a means for removing 3-MBT and other off-flavors produced by photolyses earlier in the brewing process.

A production hopped lager was photolyzed as described above. The beer was then treated with maltose syrup and fermented again for 1 week prior to finishing. A reduction of riboflavin from 250 ppb (prior to treatment) to 6 ppb (in the bottled beer) was achieved. The final 3-MBT concentration was 64 ppt. Light stability assessment gave 3-MBT levels of 32, 33, and 52 ppt after 1, 3, and 7 day light exposures. The panel detected a trace of 3-MBT in the beer exposed to light for 3 days and considered both the control and the exposed beer to have a sulfur-like taste.

Relative to the control hopped lager of Example 2, the beer had enhanced light stability.

Experimental Details

Anaerobic Photofinish, Hopped Lager with Krausening

Production lager was obtained from the plant and placed in the photofinishing apparatus with $CO_2$ connected to the gas inlet line. After photolysis was complete, the beer was transferred to a fermentation vessel and krausened for 5 days (4.0 grams yeast/liter plus 12.0 g syrup/Liter) at 4° C. The beer was then filtered and bottled.

EXAMPLE 8

Photolysis During Fermentation Followed by Krausening

The residual levels of riboflavin in the beers brewed from photolyzed wort are a consequence of secretion of riboflavin by yeasts early in the fermentation. Photolysis during fermentation might then destroy the secreted riboflavin. The beer, if hopped in the kettle, would be expected to be skunky. Secondary fermentation could then be applied to reduce the level of 3-MBT.

Hopped wort was fermented in the photofinishing apparatus and was illuminated during the fermentation. Riboflavin, at 224 ppb before fermentation, was reduced to 43 ppb during the fermentation. The beer was then krausened and, after dilution and finishing, had a riboflavin concentration of 28 ppb and a 3-MBT concentration of 70 ppt. The panel found no skunky flavor in the finished beer. Upon light stability assessment, the beer had 99, 116, and 143 ppt 3-MBT after 1, 3, and 7 days, respectively, of light exposure. The panel noted a weak skunky flavor in the 3-day exposed beer. The beer also developed a weak, rubbery, sulfur-like character.

Relative to the control hopped lager of Example 2, the beer had enhanced light stability.

Experimental Details

Hopped Lager Photofermentation with Krausening

Bitter wort was obtained from the cooler in the plant. This was pitched with yeast and placed in the photofermentor. A pump was used for mixing. After fermentation at 16° C. for 7 days, the beer was transferred to the cold room and krausened with 4.0 grams of yeast/liter plus 12.0 g syrup/liter at 4° C. The beer was then filtered and bottled.

EXAMPLE 9

Co-Fermentation with Lactic Acid Bacteria

The release of riboflavin by yeast during fermentation increases the final concentration of this vitamin to 20–40 ppb in the finished product, and this partially offsets the effects of wort photolysis on beer light stability.

A number of lactic acid bacteria are dependent on riboflavin for normal growth and, thus, consume the riboflavin in a medium in which they are present. Indeed, strains of *Leuconostoc mesenteroides* can be used to detect as little as 0.1 ng/ml (0.1 ppb) riboflavin in solution and the AOAC method for the microbiological testing of riboflavin is subsp. Rhamnosus (ATTC strain 7469). Thus, it was theorized that lactic acid bacteria could be employed to metabolize the riboflavin secreted by yeast during fermentation. This could be accomplished by adding bacteria along with the yeast at the start of fermentation (co-fermentation).

Lactic acid bacteria were therefore employed to metabolize riboflavin released by yeast during fermentation. After screening the Labatt Culture collection for bacteria that consumed riboflavin, a strain of *Leuconostoc mesenteroides* (BCC 134) was selected because of its excellent rate of riboflavin consumption. Co-inoculation of this strain with yeast into photolyzed wort resulted in a final beer with very low riboflavin concentration. Thus, the bacteria effectively consumed the riboflavin produced by the yeast. The final riboflavin concentration was less than 5 ppb. When these bacteria were co-inoculated with yeast into wort containing normal levels of riboflavin (i.e., unphotolyzed wort), the final riboflavin concentration was reduced to a level of 108 ppb, which is less than the normal level of ~240 ppb.

The light stability of beer produced from a bacterial-yeast co-fermentation of photolyzed wort was greatly enhanced compared to control beer. These data are summarized in Table H1, below. After exposure for 7 days in the light stability assessment apparatus, the concentration of 3-MBT produced was 49 ppt. A normal beer produces a concentration of ~382 ppt, whereas a yeast-only fermentation of photolyzed wort produced a concentration of only 82 ppt skunky thiol. Thus, co-fermentation with *Leuconostoc mesenteroides* (BCC 134) further enhanced the light stability of the beer produced from photolyzed wort, albeit only modestly. In a second experiment, the 7-day exposure resulted in a 3-MBT concentration of 75 ppt, which was only slightly lower than the value of 82 ppt observed from beer produced from photolyzed wort and fermented with yeast only. The first co-fermentation trial produced beer with a concentration of 1.7 ppb whereas the second produced beer with 3.6 ppb riboflavin.

Thus, it may be that a small amount of riboflavin can result in a small, but measurable, difference in light stability. In normal, unphotolyzed wort co-fermented with yeast and *Leuconostoc mesenteroides*, the 7-day light exposure of the final beer (in a light chamber with a polycarbonate filter) the co-fermentation produced a level of 218 ppt 3-MBT, which was intermediate between that of a normal beer and one produced from photolyzed wort. Thus co-fermentation with yeast and *L. mesenteroides* produces beer with enhanced light stability compared to normal control beer.

Taste panel analyses of the beer prepared from photolyzed wort and co-fermented with yeast and *L. mesenteroides* indicated a somewhat strong sulfur-like note along with a moderate light-struck note, despite the low levels of 3-MBT found. The level of perceived light struck character was similar to that of beer prepared from photolyzed wort and fermented with yeast only, but was clearly not as strong as that from control beer. In addition, the co-fermented beers had a unique sour character.

TABLE H1

Formation of 3-MBT with Light Exposure

| Beer | Description | Filter | Exposure Time (days) | [3-MBT] (ppt) |
|---|---|---|---|---|
| PB68 | Green glass | Control | | 14 |
| | Unhopped Photolysed Wort | PC | 1 | 40 |
| | Lactic acid bacteria coferm. | PC | 3 | 110 |
| | Riboflavin = 4 ppb | PC | 7 | 75 |
| PB69 | Green glass | Control (unexposed) | | 13 |

TABLE H1-continued

Formation of 3-MBT with Light Exposure

| Beer | Description | Filter | Exposure Time (days) | [3-MBT] (ppt) |
|---|---|---|---|---|
| | Unhopped Lager | PC | 1 | 145 |
| | Lactic acid bacteria coferm. | PC | 3 | 198 |
| | Riboflavin = 108 ppb | PC | 7 | 216 |
| PB64 | Green glass | Control (unexposed) | | 32 |
| | Unhopped Photolysed Wort + Steiner isohop | PC | 1 | 28 |
| | Lactic acid bacteria coferm. | PC | 3 | 58 |
| | Riboflavin = 1.7 ppb | PC | 7 | 50 |
| PB68 | Green glass | Control | | 14 |
| | Unhopped Photolysed Wort | PC | 1 | 40 |
| | Lactic acid bacteria coferm. | PC | 3 | 110 |
| | Riboflavin = 4 ppb | PC | 7 | 75 |
| | | PC | 7 | 122 |
| PB69 | Green glass | Control (unexposed) | | 13 |
| | Unhopped Lager | PC | 1 | 145 |
| | Lactic acid bacteria coferm. | PC | 3 | 198 |
| | Riboflavin = 108 ppb | PC | 7 | 216 |
| | | PC | 7 | 176 |
| | | PC | 7 | 218 |

Experimental Details

1. Media

Sweet wort was collected from the Brewhouse after lautering. The wort was collected after the grain bed had been established in the tun and approximately 20 percent of the sweet wort had passed through the Grant. The specific gravity was adjusted to 14.4° P and the pH to 5.1. Lactobacilli MRS Broth lactobacilli medium was obtained from DIFCO (Detroit Mich.) and prepared according the manufacturer's instructions.

2. Yeast and Bacterial Preparations

Yeast employed in this study was an industrial strain obtained from the brewery and was generally pre-washed to remove residual isohumulones. The strain of Leuconostoc mesenteroides was obtained from the Labatt culture collection (BCC 134). Cultures were pre-grown in liquid MRS broth at 30° C. from the 10 mL scale to 1 liter scale in stationary flasks and scaled-up further to 5–10 liters to obtain sufficient biomass for 30 liter scale wort fermentations. Cells were washed 3 times in sterile 0.5 percent (w/v) peptone by repeated centrifugation at 3000 rpm followed by re-suspension in fresh peptone. The final pellet was then re-suspended in a small volume of sweet wort before pitching.

3. Wort Photolysis

The sweet wort was transferred to the brewing kettle and reheated to 80° C. The kettle was fitted with a mechanical stirrer and a 2 kilowatt Indium Halide doped lamp. The kettle was covered with aluminum foil to help maintain the appropriate atmosphere above the kettle. Once the wort was at temperature, the lamp was energized and the wort photolyzed for 60 minutes. After the photolysis, the lamp and stirrer were removed from the kettle.

4. Un-Photolyzed Wort

Wort was obtained as described above and transferred to the kettle but no photolysis was conducted. The wort was boiled as described below.

5. Kettle Boil

Upon completion of photolysis the wort was brought to a boil. After 30 minutes boiling, 4 grams of carrageenan (in the form of Irish Moss) was added to the wort, followed by a further 15 minutes of boiling. The wort was transferred to a HopJack and allowed to stand for 10 minutes. During this time the Hot Break formed and the insoluble hop material settled out. The clarified wort was passed through a plate chiller, to cool the wort to 16° C. During kettle boil, an evaporative loss of approximately 10 percent occurred. This yielded wort with a specific gravity of 16° P and a pH of 5.1.

6. Yeast-Only Fermentation

Thirty liters of photolyzed sweet wort was collected in a stainless fermentation vessel. Brewery yeast was pitched at 0.45 percent w/v, and the wort was oxygenated to 16 ppm $O_2$. The fermentor was placed in a temperature controlled water bath at 16° C. for seven days.

7. Yeast-Bacteria Co-Fermentation

For either photolyzed or unphotolyzed wort the co-fermentations were conducted in the same manner. The wort was inoculated with 0.45 percent (4.5 g/L) brewery yeast, along with an inoculation of 0.22 percent of the lactic acid bacteria L. mesenteroides (BCC 134). Fermentation was carried out and further maturation and processing steps, along with finishing, were as described in the standard manner.

EXAMPLE 10

Aerobic Photolysis of Hopped Beer Brewed from Photolyzed Sweet Wort

The aerobic photolysis of hopped beer (Example 7) resulted in a beer with greatly improved light stability. The beer, however, had meaty, malty, oxidized off-flavors. As a means of reducing the extent of off-flavor formation, aerobic photolysis of a hopped beer brewed with photolyzed sweet wort was examined. Since the riboflavin content was lower in the beer prior to the aerobic photolysis, comparable levels of riboflavin could be obtained in the finished beers with milder light exposure.

Production sweet wort was photolyzed, hopped in the kettle, fermented, aged, and then filtered. The riboflavin content was 43 ppb. The beer was photolyzed in the photofinishing apparatus for 3 days, during which a dissolved oxygen level of 5 to 5.5 ppm was maintained. Repeated carbonation and venting yielded beer with less than 60 ppb dissolved oxygen, 4 ppb riboflavin, and 24 ppt 3-MBT. After 1, 3, and 7 days light exposure in light stability assessment apparatus, the beer had 29, 68, and 80 ppt 3-MBT, respectively. The panel found a mild oxidized, metallic off-flavor prior to the light stability assessment. After 3 days of exposure, the beer developed a moderate skunky aroma.

Relative to the control hopped lager of Example 2, the beer had enhanced light stability.

Experimental Details

The sweet wort was photolyzed as described above. Photolysis of the resulting beer in photofinishing apparatus was performed as described above for the aerobic photolysis of hopped beer, the only difference being that the photolysis was restricted to two days.

EXAMPLE 11

Anaerobic Photolysis of Hopped Beer Brewed from Photolyzed Sweet Wort Followed by Krausening The beer brewed by krausening anaerobically photolyzed hopped beer had very good light stability (Example 7), but it also had some sulfur-like off-flavors. The sulfur-like off-flavors in this beer were probably a consequence of the anaerobic photolysis. It was theorized that if the beer had lower levels of riboflavin prior to aerobic photolysis, then milder conditions could used in this photolysis, which would be expected to produce less off-flavor. Accordingly, beer was brewed from sweet wort, hopped in the kettle, fermented, aged, and filtered. The beer had 11 ppb riboflavin after fermentation. The beer was then photolyzed for 2 days in the photofinishing apparatus, krausened, and finished as usual to give beer with 8 ppb riboflavin and 20 ppt 3-MBT. The beer was judged by the panel as having a mild sulfur-like off-flavor. Light stability assessment gave 46, 22, and 64 ppt 3-MBT after exposures of 1, 3, and 7 days respectively. The panel judged the 3 day exposed beer to be moderately skunky.

Relative to the control hopped lager OF Example 2, the beer had enhanced light stability.

EXAMPLE 12

Photolysis During Fermentation of Hopped Wort Prepared from Photolyzed Sweet Wort The beer brewed from hopped wort using photolysis during fermentation followed by krausening (Example 8) had enhanced light stability, but did develop a weak skunky flavor upon light exposure after bottling. A hopped beer brewed from photolyzed sweet wort would be expected to require less light exposure during fermentation since the riboflavin levels would be lower. Since riboflavin secretion occurs only during the early active growth phase of the fermentation, the light exposure could be restricted to this period and then, during the rest of the fermentation, the yeast would be expected to take up the 3-MBT along with the other substances responsible for other sulfur-like off-flavors as they do during krausening.

Accordingly, hopped wort was prepared from photolyzed sweet wort and fermented in the photofermenter. The lights were extinguished after three days of fermentation and the fermentation was taken to completion in the dark. The beer was aged, filtered, and finished as usual. The hopped wort had 2 ppb riboflavin which rose to 6 ppb after photolysis. The bottled beer had 16 ppb of riboflavin and 114 ppt 3-MBT. The panel detected no skunky character in the finished beer. Light stability assessment after 1, 3, and 7 days light exposure, was 115, 160, and 267 ppt 3-MBT, respectively. The panel noted a faint skunky aroma in the 3-day exposed beer. The unexposed beer had a meaty, sulfur-like, oxidized off-flavor, which increased with light exposure.

Relative to the control hopped lager of Example 2, the beer had enhanced light stability with respect to 3-MBT formation.

EXAMPLE 14

As discussed above, excited isohumulone can, in principle, be generated by direct absorption of ultraviolet light. The UV spectrum of trans isohumulone shows a small but real absorption of light up between 300 nm and approximately 350 nm. Flint glass, which absorbs all light below 300 nm, does not, therefore, completely protect isohumulones from direct UV excitation.

The beers described in the previous examples have enhanced light stability. However, since these beers contain isohumulones, exposure to light in the 300 to 350 nm range, can, in principle, result in the formation of 3-MBT via the direct excitation of isohumulones. Sunlight and cool white fluorescent lamps both have significant emissions in this range of wavelengths. For example, cool white fluorescent lamps have an emission line at 314 nm. The light stability of beers with depleted riboflavin would, therefore, benefit from protection from light in the 300 to 350 nm range.

Cerium oxide is a colorless solid that, when added to flint glass, gives a colorless glass that absorbs UV light shorter than 350 nm.

Another alternative for colorless packaging is polycarbonate either as a film over flint glass or as the package material or as a component of the package material. Both cerium oxide and polycarbonate absorb most of the UV light in the 350 to 300 nm range.

The effect of protection by cerium oxide and polycarbonate light filters on the stability of a production lager packaged in flint glass and exposed to cool white fluorescent light was examined. The results are shown in Table IV. The beer had 186 ppb riboflavin and 12 ppm isohumulones.

TABLE IV

Concentration of 3-Methylbutene Thiol in Hopped Production Lager in Flint Glass Bottles after 1 Week Exposures with Various Light Filter Screens

| Screen (UV cutoff) | [3-methylbutene thiol] (ppt) |
| --- | --- |
| None (30 nm) | 375 |
| None (300 nm) | 332 |
| Cerium Oxide (360 nm) | 269 |
| Cerium Oxide | 269 |
| Polycarbonate (390 nm) | 250 |
| Polycarbonate (390 nm) | 189 |

These results indicate that filtration of the light through 1.5 percent cerium oxide in flint glass (see Experimental Details) results in a 25 percent reduction in the amount of 3-MBT formed during the light exposure. Polycarbonate filtration gave a 40 percent reduction in 3-MBT formation.

The experiments were repeated using a hopped beer brewed from photolyzed sweet wort.

The riboflavin concentration in the finished beer was 25 ppb and the isohumulone content was 12 ppm. The results, summarized in Table V, clearly show the same pattern as those obtained from the hopped production lager. Cerium oxide light filtration resulted in a 21 percent reduction in the amount of 3-MBT formed with the light exposure, while polycarbonate filtration gave a 39 percent reduction.

TABLE V

Concentration of 3-Methylbutene Thiol in Hopped Lager Brewed with Photolyzed Sweet Wort in Flint Glass Bottles after 1 Week Exposures with Various Light Filter Screens.

| Screen (UV cutoff) | [3-methylbutene thiol] (ppt) |
|---|---|
| None (30 nm) | 139 |
| None (300 nm) | 132 |
| Cerium Oxide (360 nm) | 118 |
| Cerium Oxide | 96 |
| Polycarbonate (390 nm) | 98 |
| Polycarbonate (390 nm) | 96 |

Conclusions

The light stability of production hopped beers and riboflavin deficient hopped beers packaged in flint glass is improved by the application of colorless UV absorbing filters. The same benefits would be obtained if the UV absorbing materials were, in the case of cerium oxide, used as a component in the glass or in the case of polycarbonate, used as a coating on flint glass.

Experimental Details

Light Exposures for Light Stability Assessment

Beers were placed in a rectangular sectioned black box. The light source was a 40 watt cool-white fluorescent light flanked by a wooden frame wherein cerium oxide glass (1.5 percent by weight) or polycarbonate screens were mounted. The intensity of the light as measured with a hand held luminometer (Cooke details) was 600 Lux. The apparatus and the samples were located in a cold room (4° C.) and the heat produced by the lamp was dissipated with cooling fans.

The invention has been described in detail with particular reference to preferred embodiments thereof, but it is understood that variations and modifications can be effected within the spirit and scope of the invention.

What is claimed is:

1. A process for the prevention of the production of skunky thiols upon exposure to ultraviolet or visible light of beer containing riboflavin comprising removing or inactivating at least a portion of said riboflavin by co-fermenting the beer with a combination of yeast and *Leuconostoc mesenteroides*.

2. In a process for the production of a beer containing riboflavin as a by-product wherein a process liquid is hopped to produce the desired beverage, the improvement comprising co-fermenting the process liquid with yeast and *Leuconostoc mesenteroides*.

3. The process of claim 1 further comprising the step of removing or inactivating at least a portion of said riboflavin by photolysis prior to the co-fermentation step.

4. The process of claim 2 wherein the process liquid is photolysed prior to the co-fermentation step.

* * * * *